(12) United States Patent
Colantonio et al.

(10) Patent No.: US 6,453,961 B1
(45) Date of Patent: Sep. 24, 2002

(54) VARIABLE-STIFFNESS WEDGE INSERT FOR RUNFLAT TIRE

(75) Inventors: Laurent Colantonio, Bastogne (BE); Alain Emile Francois Roesgen, Luxembourg (LU); Filomeno Gennaro Corvasce, Mertzig (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 86 days.

(21) Appl. No.: 09/585,516

(22) Filed: Jun. 1, 2000

(51) Int. Cl.[7] .......................... B60C 17/00; B60C 17/08
(52) U.S. Cl. ........................................................ 152/517
(58) Field of Search ................................. 152/516–518

(56) References Cited

U.S. PATENT DOCUMENTS

| | | | |
|---|---|---|---|
| 3,994,329 A | * 11/1976 | Masson et al. ............. 152/310 |
| 4,059,138 A | 11/1977 | Mirtain et al. | |
| 4,111,249 A | 9/1978 | Markow | |
| 4,287,924 A | * 9/1981 | Deck ......................... 152/153 |
| 4,779,658 A | 10/1988 | Kawabata et al. | |
| 5,368,082 A | 11/1994 | Oare et al. | |
| 5,427,166 A | 6/1995 | Willard, Jr. | |
| 5,511,599 A | 4/1996 | Willard, Jr. | |
| 5,526,862 A | * 6/1996 | Ghilardi ..................... 152/458 |

FOREIGN PATENT DOCUMENTS

| | | | |
|---|---|---|---|
| DE | 2711044 | * | 9/1977 |
| EP | 0542252 | | 5/1993 |
| JP | 62255205 | * | 11/1987 |

* cited by examiner

*Primary Examiner*—Michael W. Ball
*Assistant Examiner*—Justin Fischer
(74) *Attorney, Agent, or Firm*—Howard M. Cohn

(57) ABSTRACT

A pneumatic radial ply runflat tire 1000 for a vehicle has a tread 1012, a carcass 1022 comprising at least one radial ply 1030 and two sidewalls 1016 each reinforced by a circumferentially disposed crescent-shaped wedge insert. Each insert has an elastomeric porous section 1042 embedded in an elastomeric stiffer layer 1044 of the insert 1040. When the tire is normally inflated, the porous section 1042, and hence the insert as a whole, is flexible, thereby providing comfortable driving characteristics. Under runflat (deflated tire) conditions, the pores in the porous section 1042 collapse, and the porous section 1042 stiffens, and hence the insert as a whole becomes stiff enough to support the load of the vehicle.

10 Claims, 7 Drawing Sheets

VARIABLE-STIFFNESS WEDGE INSERT FOR RUNFLAT TIRE

TECHNICAL FIELD

This invention relates to pneumatic radial-ply runflat tires and in particular to runflat tire construction wherein a sidewall wedge insert allows for sidewall flexibility under normal-inflated operating conditions yet provides high rigidity under deflated operating conditions.

BACKGROUND OF THE INVENTION

Various methods have been devised for enabling the safe continued operation of deflated or underinflated (flat) tires without damaging the tire further and without compromising vehicle handling while driving to where the tire can be changed. Loss of tire pressure can result from a variety of causes such as a deteriorated seal between the tire and rim or a tire puncture by a sharp object such as a nail.

Pneumatic tires designed for continued operation under deflated or underinflated conditions are referred to as "extended mobility technology" tires or "EMT" tires. They are also called "runflat" tires, as they are capable of being driven in the flat condition. EMT (runflat) tires are designed to be driven in the deflated condition, whereas the conventional pneumatic tire collapses upon itself when subjected to a vehicle load while deflated. The sidewalls and internal surfaces of EMT tires do not collapse or buckle onto themselves. In general, the terms "EMT" and "runflat" mean that the tire structure alone has sufficient strength to support the vehicle load when the tire is operated in the deflated state. In particular, the sidewalls are reinforced to carry the tire's load without the need for other supporting structures or devices that are disposed internal to but separate from the tire. An example of the latter internal supporting structure is shown in U.S. Pat. No. 4,059,138, entitled "Run-flat Tire and Hub Therefor."

Numerous other methods and tire construction have been used to achieve workable runflat tire designs. For example, a runflat tire structural design described in U.S. Pat. No. 4,111,249, entitled "Banded Tire," shows the use of a hoop or annular band approximately as wide as the tread placed under the tread. The hoop in combination with the rest of the tire structure could support the vehicle weight in the deflated condition.

Generally, runflat tires incorporate reinforced sidewalls that are sufficiently rigid so as not to collapse or buckle onto themselves. Such sidewalls are thicker and stiffer than in conventional tires, so that the tire's load can be carried by-a deflated tire without compromising vehicle handling until such reasonable time as the tire can be repaired or replaced. The methods of sidewall stiffening include the incorporation of "inserts" (also called "wedge inserts"), which are fillers generally having a cross-sectional crescent shape. Such inserts are located in the inner peripheral surface of the sidewall portion of the carcass, which is the region in the tire experiencing the greatest flex under load. The sidewalls of such tires, when operated in the deflated condition, experience a net compressive load in which the outer portions of the sidewalls are under tension due to the bending stresses while the inside portions are correspondingly in compression, especially in the region of the sidewall midway between the tire's bead region and the ground-contacting portion of the tread.

During runflat operation (i.e. while running underinflated), due to the large mass of rubber required to stiffen and reinforce the runflat tire's sidewalls, heat buildup from cyclical flexure of the sidewalls is a major cause of tire failure, especially when the deflated tire is operated for prolonged periods of time and at high speeds. During normal inflated operation, the hysteresis of the material of the thickened runflat tire's sidewalls contributes to its rolling resistance, which reduces the vehicle's fuel efficiency. The additional weight of the insert is also a disadvantage in handling and mounting a runflat tire.

U.S. Pat. No. 5,368,082 ('082) by Oare et al, having a common assignee with the present invention, disclosed the first commercially accepted runflat pneumatic radial ply tire. This patent describes the employment of sidewall wedge insert reinforcements ("inserts") to improve stiffness. The runflat tire of '082 was generally a low aspect tire constructed with two plies, an innerliner and two inserts in each sidewall, which are disposed such that one insert is located between the two plies while the other insert is located between the innerliner and the innermost ply. Approximately six additional pounds of weight per tire was required by this low aspect ratio runflat tire to support a 362 kg. (about 800 lb.) load when deflated. This weight penalty was even more problematic when the engineers attempted to build high-aspect-ratio tires for large heavy vehicles, such as touring sedans. The supported weight for an deflated luxury car tire can exceed 453 kg. (about 1,000 lbs.). Such taller sidewalled tires, having aspect ratios in the 55% to 65% range or greater, have sidewall bending stresses that are several times that of earlier low-aspect-ratio runflat tires. The ability to handle such loads required that the sidewalls and overall tire had to be stiffened to the point of adversely affecting riding comfort and some handling characteristics. Current runflat tire design requires that there be no loss in riding comfort or vehicle handling. In the very stiff suspension performance type vehicle, such as sports cars and various sport/utility vehicles, the ability to provide such runflat tires was relatively straightforward compared to providing similar runflat tires for luxury sedans which require a softer ride. Light truck and sport utility vehicles, although not as sensitive to ride performance, provide a runflat tire market that ranges from accepting a stiffer ride to demanding the softer luxury type ride.

The runflat tire designs incorporating sidewall inserts of the sort described by Oare et al. add weight to the tire while also causing flexural heat buildup in the wedge insert material, especially during runflat operation when the magnitude of the cyclical sidewall flexure is greatest. And, as mentioned, normal-inflated riding comfort is also compromised by the additional sidewall stiffness, and the tire's rolling resistance is greater than that of corresponding non-runflat designs. Thus, the design goals of runflat tire designers are to minimize tire weight, minimize heat buildup during runflat operation (especially at high speed) and normal-inflated operation, give minimum rolling resistance, good riding comfort and acceptable handling characteristics.

U.S. Pat. Nos. 5,427,166 ('166) and U.S. Pat. No. 5,511, 599 ('599), both to Walter L. Willard, Jr., show Michelin tires that incorporate an additional third ply and a third insert in the sidewall to further increase the runflat performance of the tire over that of Oare et al. Both the '166 and '599 patents discuss some of the load relationships that occur in the deflated condition of the tire and demonstrate that the concept shown by Oare et al can be applied to additional plies as well as additional inserts in each sidewall. However, the use of multiple plies and inserts in each sidewall has drawbacks which include increased tire weight, increased flexure-induced heat buildup, and increased complexity in tire design, manufacturing and quality control.

A tire's service life is dominated by normal inflated operation. Therefore, the main and most immediate design goals are good riding comfort and low rolling resistance, with tire weight being of secondary importance to the extent that it should not adversely affect the performance of sports-type vehicles. As for heat buildup, it is mostly a problem during runflat operation, being a major contributing factor to the inevitable deterioration of the tire when operated in a deflated mode.

Another example of a runflat tire design that at least partially achieves the same riding-comfort goal while also addressing the tire weight problem is covered in Patent Application Serial No. PCT/US98/13929, filed Jul. 6, 1998, and having a common assignee with the present invention. In this application, a metal-reinforced first ply carries a major part of the compressive load during runflat operation, which allows the thickness of the wedge-insert reinforcements to be less than otherwise would be needed. During normal-inflated operation, that metal-reinforced first ply experiences primarily tensile loading and also provides improved sidewall flexibility during normal inflated operation. During runflat operation, however, the metal members of the first ply undergo substantial compressive loading, especially in the sidewall portions that are most immediately adjacent to the ground-contacting portion of the tread. The tire of the invention described by the PCT/US98/13929 application addresses the design goals of full-inflated riding comfort, tire weight and extended runflat service life, but at the cost of the manufacturing penalties associated with the use of a high-modulus metal-reinforced first ply.

U.S. Pat. No. 4,779,658 discloses a tire having a pair of crescent-shaped cross-section reinforcing layers (wedge inserts), each comprising an axially outer stiffer rubber layer and an axially inner softer anticrack rubber layer. The load applied to the tire during runflat travel is supported mainly by the stiffer rubber layer, while crack generation can be reduced by the presence of the anticrack rubber layer. In the first embodiment, the anticrack rubber covers the entire inner surface of the higher elastic rubber layer. In the second embodiment, the anticrack rubber layer is only near the tire's shoulder or above the higher elastic rubber layer to cover only the upper inclined inner surface of the higher elastic rubber layer.

European Patent No. 542,252 discloses a tire whose carcass incorporates at each sidewall a first and second reinforcing insert between the first and second ply. Against the carcass is applied an elastic support insert comprising a stiff counter core and a low modulus elastic cover.

SUMMARY OF THE INVENTION

The present invention relates to a pneumatic radial ply runflat tire having a tread, a belt structure, and a carcass comprising two beads, two sidewalls, at least one radial ply, and at least one wedge insert in each sidewall. Each insert comprises an elastomeric porous section located at the axially-inner portion of the insert and embedded in an elastomeric stiffer layer which constitutes the remainder of the insert.

The elastomeric porous section can be cross-sectionally crescent-shaped, semicircular, or triangular. The elastomeric porous section is a closed cell porous elastomer or thermoplastic elastomer. The porosity of the porous sections is between 10 and 40 percent elastomer. The elastomeric porous section can also be an open cell foam having a porosity of between 60 and 90 percent of elastomer and the remainder is gas. The porous section has a compressive modulus of between 3 MPa and 10 MPa as the section is squeezed and a compressive modulus of between 15 MPa and 80 MPa when the porous section has collapsed. The stiffer layer is a nonporous elastomer or thermoplastic elastomer having a compressive modulus of between 3 MPa and 30 MPa.

In another embodiment, each insert comprises a cross-sectionally triangular elastomeric porous section embedded in the radially-central axially-inner portion of the insert, affixed to a flexible inextensible hinge section embedded in the axially-outer portion of the insert, and two stiff wedges, stiffer than the porous section, that constitute the remainder of the insert.

When the tire is normally inflated, the porous section, and hence the insert as a whole, is flexible, thereby providing comfortable driving characteristics. Under runflat (deflated tire) conditions, the pores in the porous section collapse, and the porous layer stiffens, and the insert as a whole becomes stiff enough to support the load of the vehicle.

BRIEF DESCRIPTION OF THE DRAWINGS

Reference will be made in detail to preferred embodiments of the invention, examples of which are illustrated in the accompanying drawings. The drawings are intended to be illustrative, not limiting. Certain elements in some of the drawings may be illustrated not-to-scale for illustrative clarity.

In the drawings, the hundredths place of each reference number usually matches the figure number, and similar elements are usually referred to by similar references numbers. For example, element 199 in FIG. 1, element 299 in FIG. 2, and element 399 in FIG. 3 might indicate corresponding or substantially similar elements. Such a relationship, if any, between similar elements in different figures or embodiments will become apparent throughout the specification, including, if applicable, in the claims and abstract.

In some cases, in a single drawing, similar elements may be assigned the same number. For example, both beads of the same tire may be assigned the same numeral 136.

For illustrative clarity, the cross-sectional views presented herein may be in the form of "slices" or "near-sighted" cross-sectional views omitting certain background lines which would otherwise be visible in a true cross-sectional view.

Figure 1:
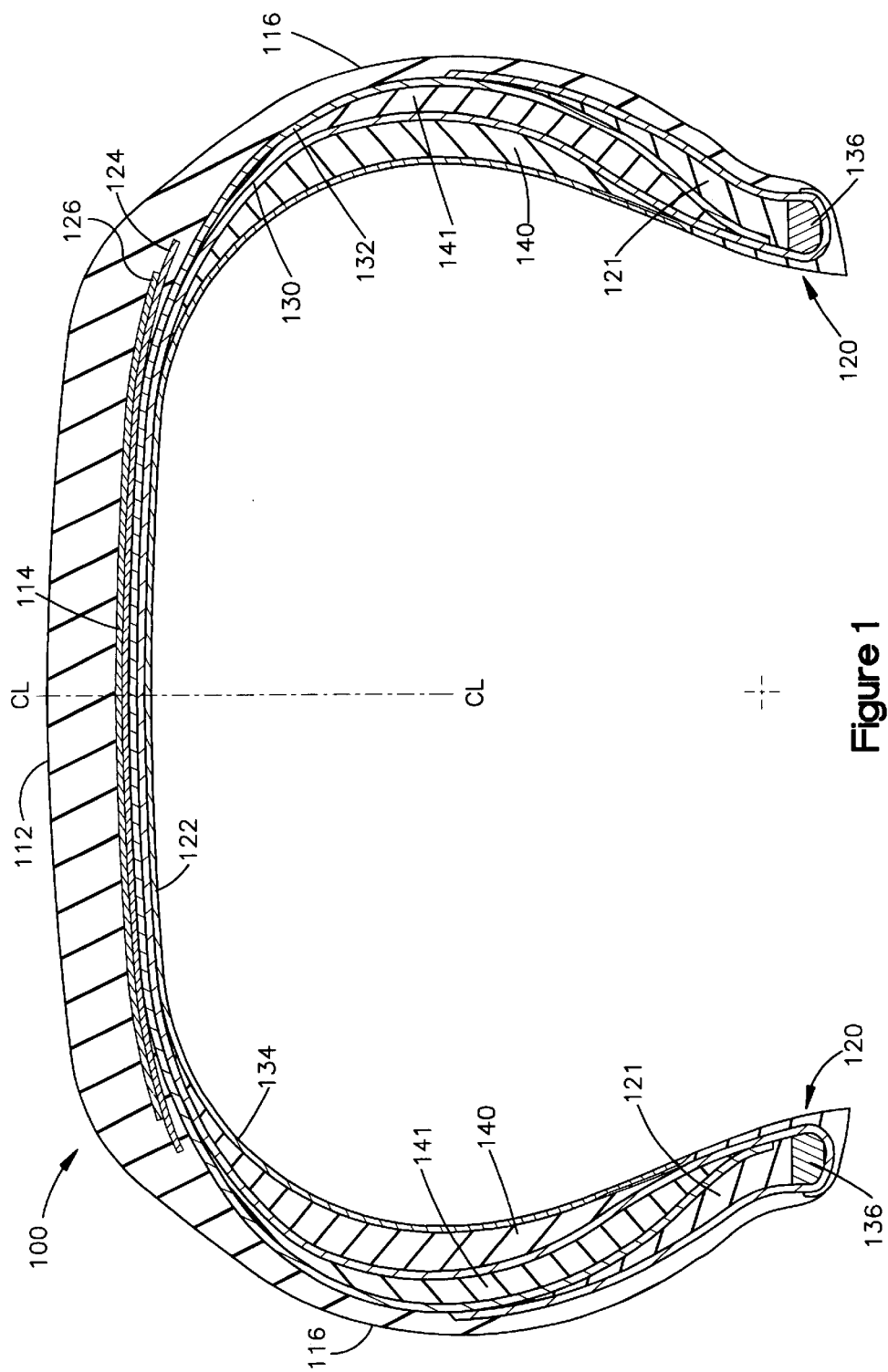
Figure 2:
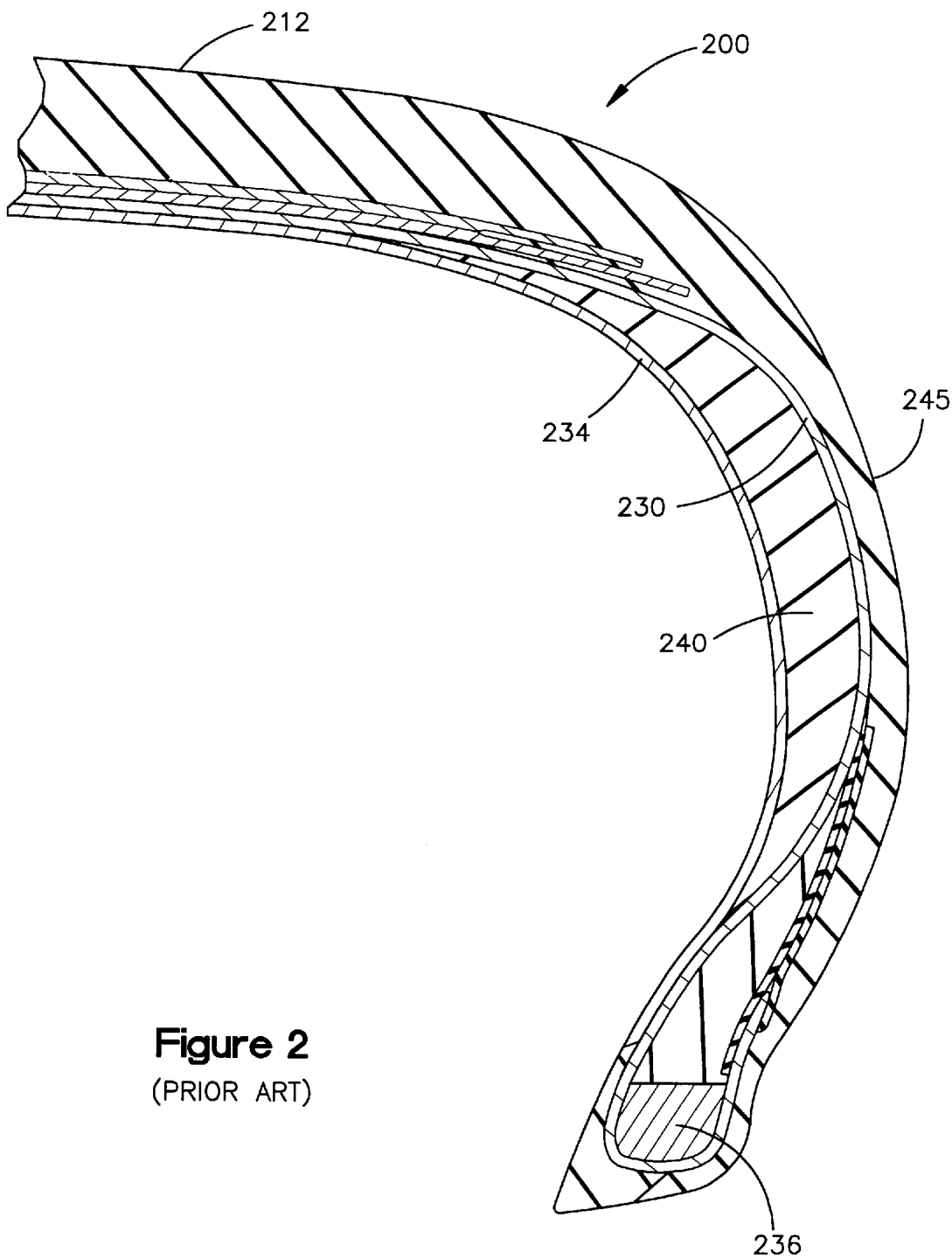
Figures 3, 4A, 4B:
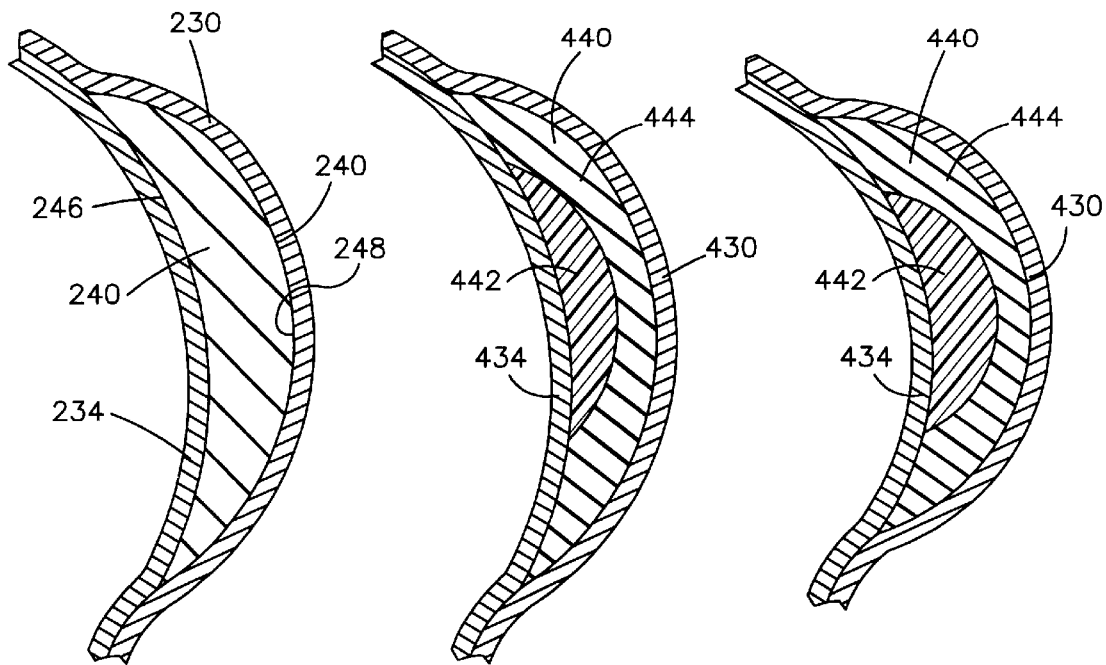
Figures 5A, 5B:
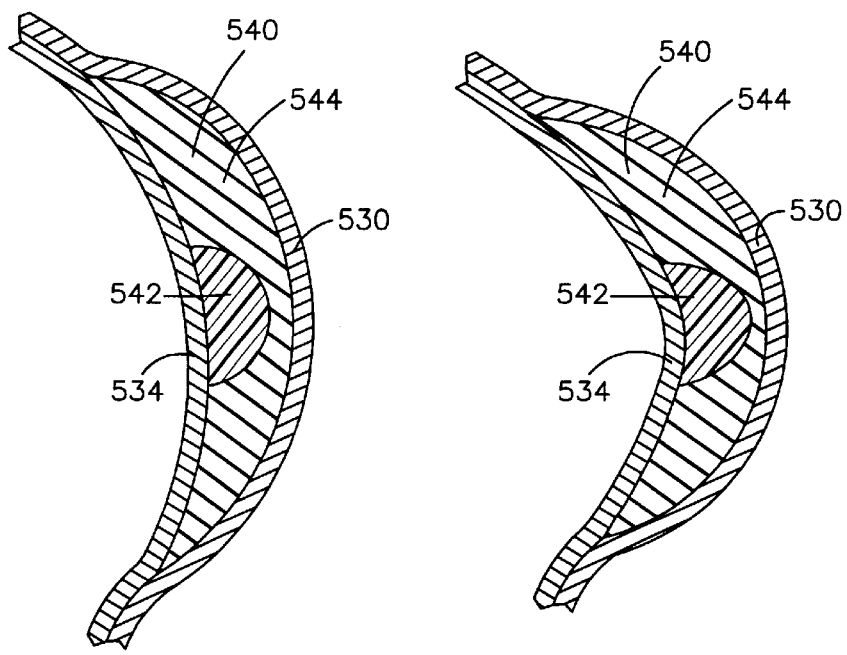
Figure 6A:
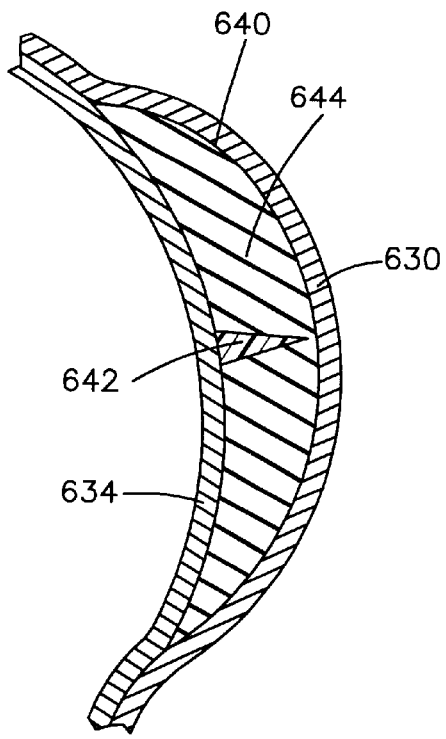
Figure 6B:
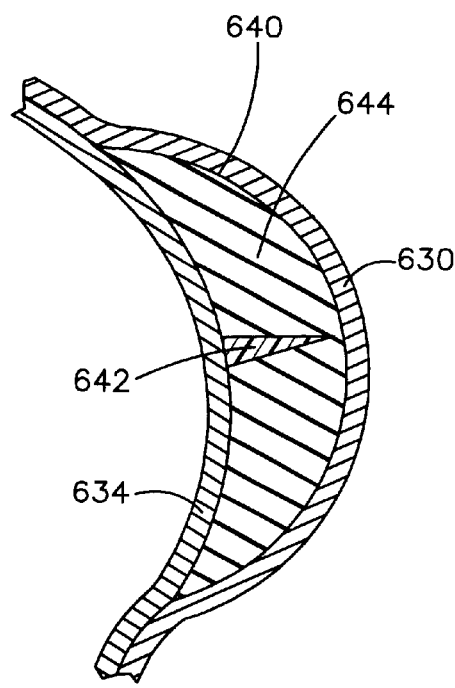
Figure 7A:
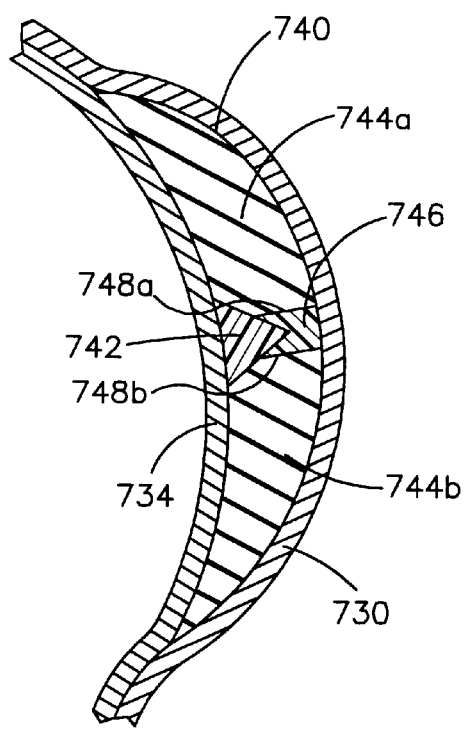
Figure 7B:
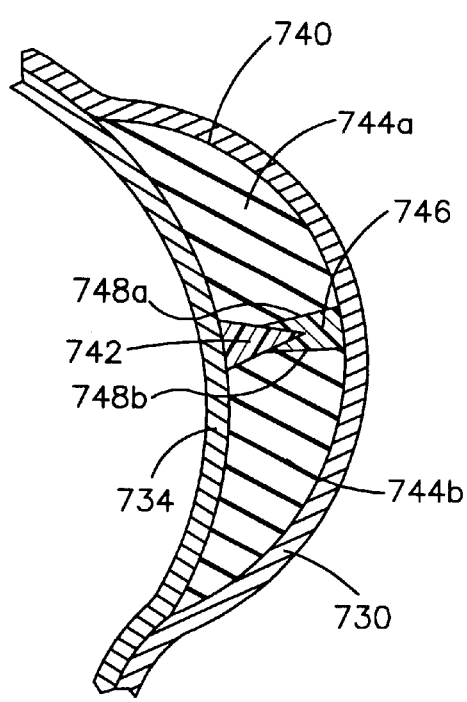
Figure 8:
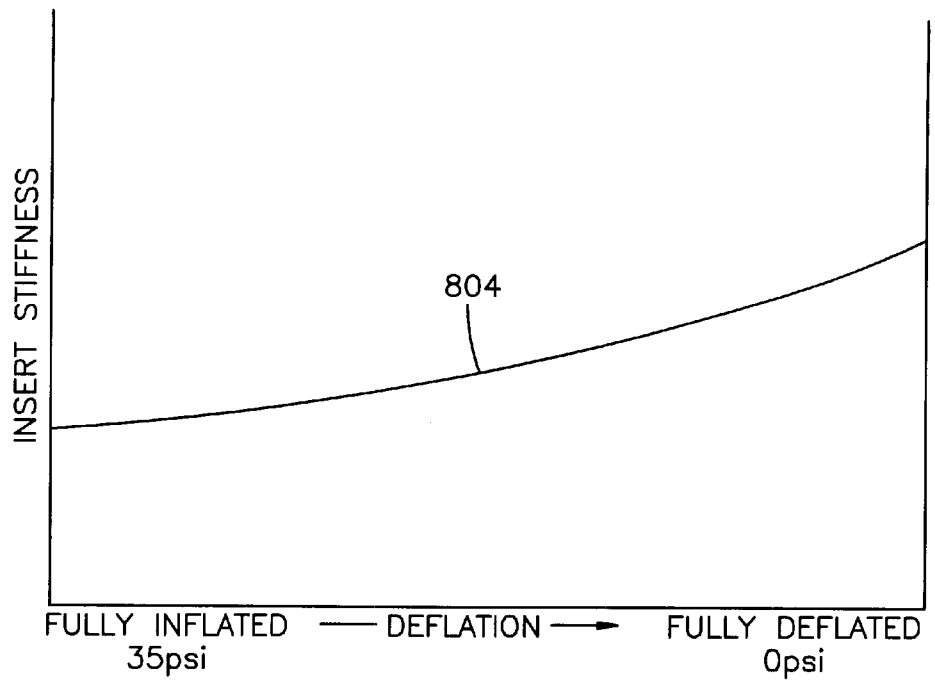
Figure 9:
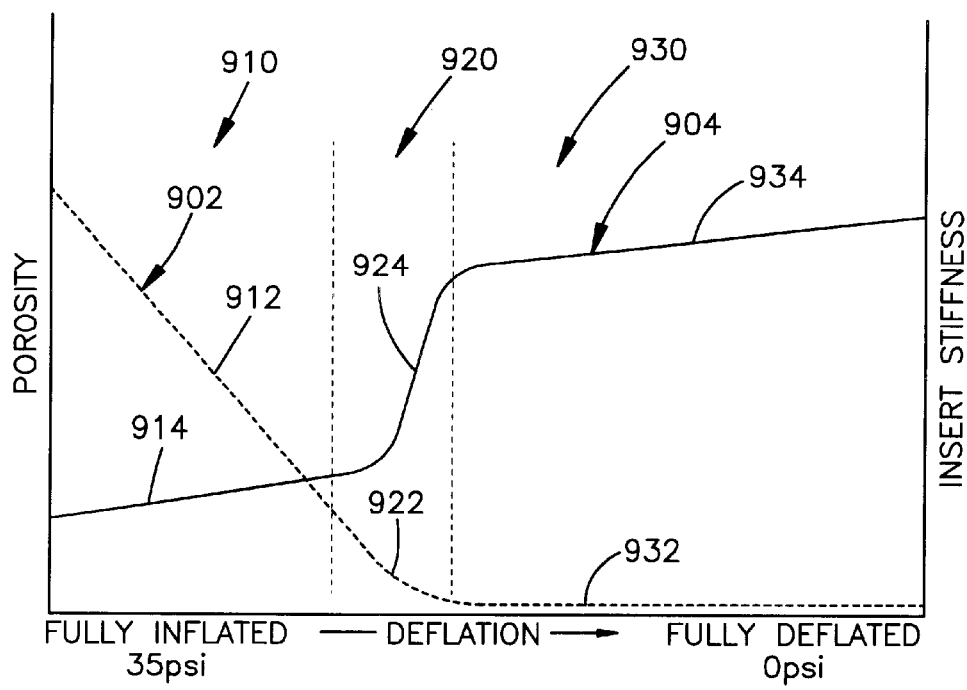
Figure 10:
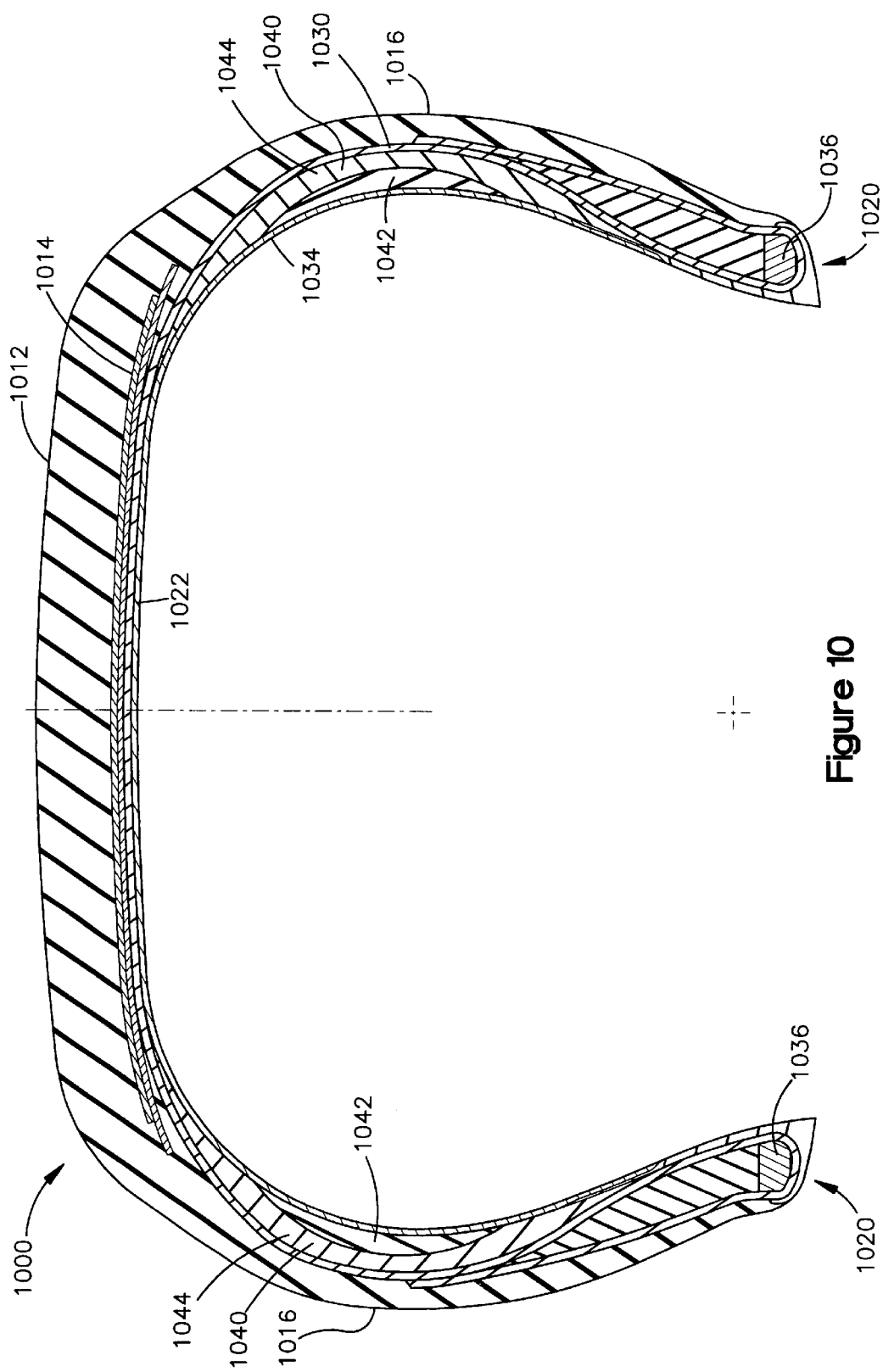
Figure 11A:
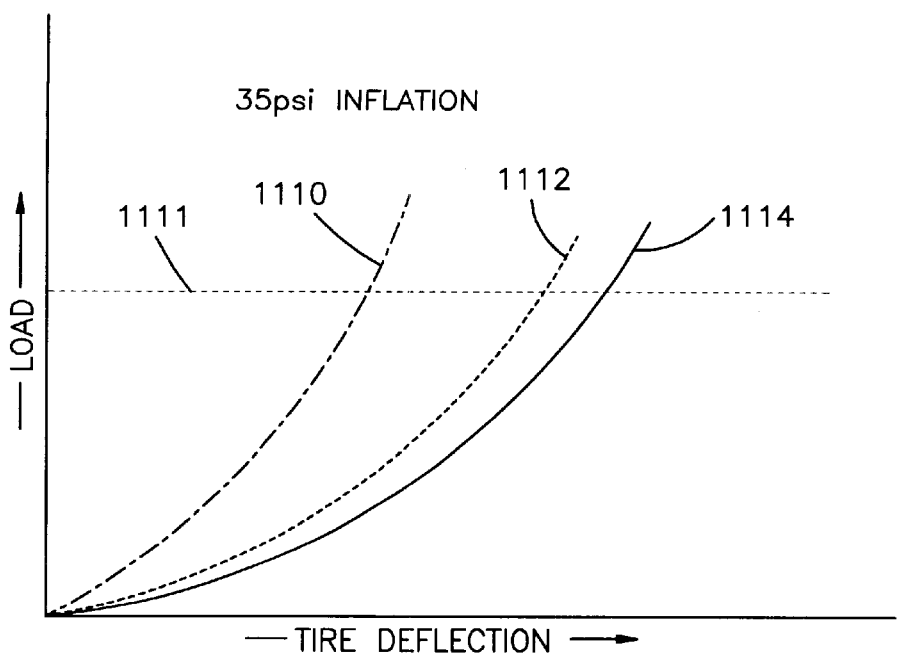
Figure 11B:
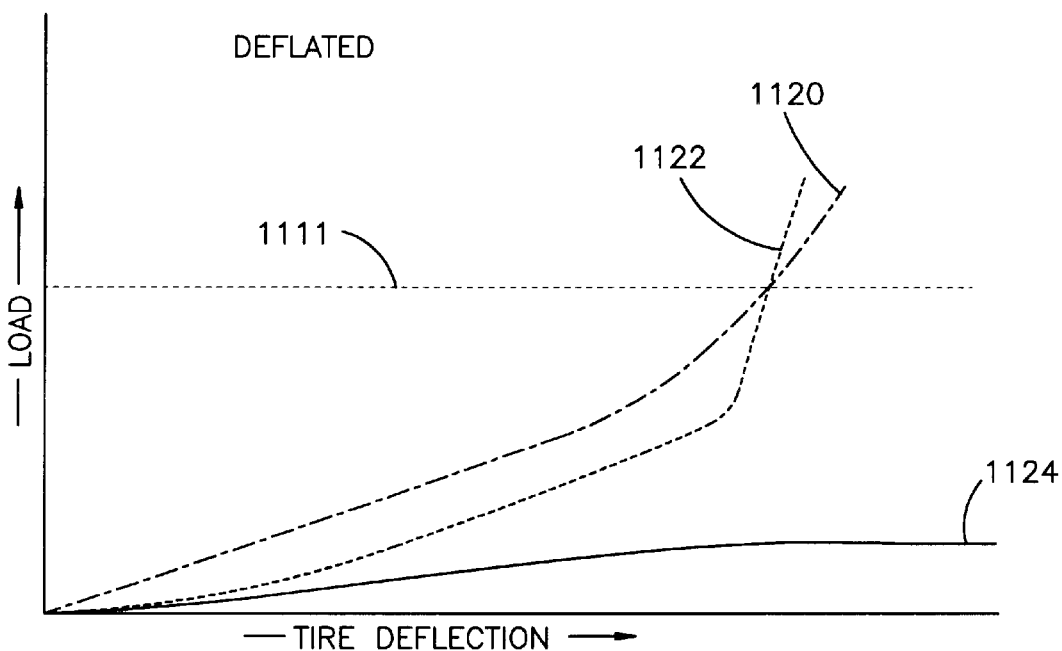

The structure, operation, and advantages of the invention will become further apparent upon consideration of the following description taken in conjunction with the accompanying drawings, wherein:

FIG. 1 is a cross-sectional view of a prior art runflat tire having multiple wedge inserts in each sidewall;

FIG. 2 is a cross-sectional view of one side of a prior art runflat tire having a single wedge insert in each sidewall;

FIG. 3 is a schematic fragmentary cross-sectional view of a prior art wedge insert;

FIG. 4A is cross-section of one embodiment of an insert according to the present invention, shown as it would be in a normally inflated tire;

FIG. 4B is cross-sectional view of the insert of FIG. 4A, shown as it would be in runflat operation;

FIG. 5A is cross-sectional view of a second embodiment of an insert according to the present invention, shown as it would be in a normally inflated tire;

FIG. 5B is cross-sectional view of the insert of FIG. 5A, shown as it would be in runflat operation;

FIG. 6A is cross-sectional view of a third embodiment of an insert according to the present invention, shown as it would be in a normally inflated tire;

FIG. 6B is cross-sectional view of the insert of FIG. 6A, shown as it would be in runflat operation;

FIG. 7A is cross-sectional view of a fourth embodiment of an insert according to the present invention, shown as it would be in a normally inflated tire;

FIG. 7B is cross-sectional view of the insert of FIG. 7A, shown as it would be in runflat operation;

FIG. 8 is a graph of rigidity tread of a prior art insert vs. tire deflation;

FIG. 9 is a graph of rigidity of an insert of the present invention vs. tire deflation;

FIG. 10 is a cross-sectional view of a runflat tire according to the first embodiment of the present invention;

FIG. 11A is a graph of load vs. tire deflection for a normally inflated tire, for a non-runflat tire 1114, a prior art runflat tire 1110, and a tire according to the present invention 1112; and FIG. 11B is a graph of load vs. tire deflection for a deflated tire, for a non-runflat tire, a prior art runflat tire, and a tire according to the present invention.

DEFINITIONS

"Apex" means an elastomeric filler located radially above the bead core and between the plies and the turnup plies.

"Aspect ratio" means the ratio of the section height of a tire to its section width; also refers to the cross-sectional profile of the tire; a low-profile tire, for example, has a low aspect ratio.

"Axial" and "axially" means the lines or directions that are parallel to the axis of rotation of the tire.

"Bead" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Belt structure" means at least two annular layers or plies of parallel cords, woven or unwoven, underlying the tread, unanchored to the bead, and having both left and right cord angles in the range from 18° to 30° relative to the equatorial plane of the tire.

"Carcass" means the tire structure apart from the belt structure, the tread, the undertread and sidewall rubber over the plies, but including the beads.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Equatorial plane" means the plane perpendicular to the tire's axis of rotation and passing through the center of its tread; or the plane containing the circumferential centerline of the tread.

"EMT tire" means "extended mobility technology" tire, which means the same as "runflat" tire.

"Innerliner" means the layer or layers of elastomer or other material that form the inside surface of a tubeless tire and that contain the inflating fluid within the tire.

"Insert" meaning "wedge insert" is the crescent- or wedge-shaped reinforcement typically used to reinforce the sidewalls of runflat-type tires; it also refers to the elastomeric non-crescent-shaped insert that underlies the tread.

"Lateral" means a direction parallel to the axial direction.

"Meridional" refers to the meridian direction of a tire as, for example, a meridional cross-sectional view in which the plane of the cross section contains the tire's axis.

"Modulus of Elasticity" is stress vs. strain of a material, where stress is the dimensionless ratio of inches compressed to total inches long.

"Normal inflation pressure" means the specific design inflation pressure at a specified load assigned by the appropriate standards organization for the service condition for the tire.

"Ply" means the same as "carcass ply," which is a cord-reinforced layer of rubber-coated meridionally deployed or otherwise parallel cords.

"Radial" and "radially" mean directions radially toward or away from the axis of rotation of the tire.

"Radial ply structure" means the one or more carcass plies in which at least one ply has reinforcing cords oriented at an angle of between 65° and 90° with respect to the equatorial plane of the tire.

"Radial ply tire" means a belted or circumferentially-restricted pneumatic tire in which at least one ply has cords which extend from bead to bead and are laid at cord angles between 65° and 90° with respect to the equatorial plane of the tire.

"Runflat" or "runflat tire" is a pneumatic tire that is designed to provide limited service while uninflated or underinflated.

"Section height" means the radial distance from the nominal rim diameter to the outer diameter of the tire at its equatorial plane.

"Section width" means the maximum linear distance parallel to the axis of the tire and between the exterior of its sidewalls when and after the tire has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

DETAILED DESCRIPTION OF THE INVENTION

Prior Art Embodiment

FIG. 1 shows a cross section of a typical prior art pneumatic radial runflat tire 100. The tire 100 has a tread 112, a belt structure (belts) 114 comprising a first or inner belt 124 and a second or outer belt 126, a pair of sidewalls 116 and a carcass 122. The carcass 122 comprises a first or inner ply 130, a second or outer ply 132, a gas-impervious innerliner 134 and a pair of bead regions 120. Each bead region 120 comprises a bead 136 and a bead filler apex 121. Each sidewall 116 contains a first, or axially innermost, wedge insert 140 and a second, or axially-outermost, wedge insert 141. The innermost inserts 140 are disposed between the innerliner 134 and the first ply 130, while the second wedge inserts 141 are disposed between the first ply 130 and the second ply 132. The two pairs of wedge inserts 140,141 in each sidewall portion 116, respectively, impart to the sidewalls a greater structural modulus of elasticity (rigidity) for resisting the otherwise extreme deformations that, during low or zero inflation pressure, would be imposed upon those parts of the sidewall portions that are most immediately adjacent to the ground-contacting portion of the tread 112. The insert reinforced sidewalls 116 of carcass 122 thus impart to the tire 100 a limited runflat capability.

As can be seen from FIG. 1, the structural reinforcements in the sidewall portions of the tire 100 substantially increase the overall thickness of the sidewalls 116. In fact, the view of this generalized prior art runflat tire 100 demonstrates the more or less uniformly thickened sidewalls 116 that characterize runflat tire designs. The insert-reinforced sidewalls 116 support the load of the tire 100 with minimal sidewall deflection when the tire is deflated. Such a runflat tire design generally provides good vehicle handling and performance under conditions of full inflation, and it provides acceptable runflat vehicle handling and an acceptable runflat operational life when the tire is deflated.

FIG. 2 is a cross-sectional view of one side of a prior art runflat tire 200 that is a variation of the tire 100 of FIG. 1. Components of the other side of the tire cross-section (not shown) are substantially identical to those of the side of the cross-section shown. The tire 200 has one crescent-shaped wedge insert 240 in each sidewall 245. The tire 200 also has a single carcass ply 230 rather than the two carcass plies 130,132 shown in the prior art tire 100 of FIG. 1. Each insert 240 is disposed within the sidewall 216, between the carcass ply 230 and an innerliner 234. The prior art inserts 140,141, 240 of the prior art tires 100 and 200 can be constructed of a wide range of elastomeric materials.

FIG. 3 is a fragmentary "near-sighted" cross-sectional view of the prior art single-wedge-insert-per-sidewall design shown in FIG. 2, omitting certain lines which would otherwise be visible in a true cross-sectional view. The elements in FIG. 3 are the same as the elements in FIG. 2 with the same reference numbers. Such a fragmentary view will allow a simplified discussion of the dynamics of inserts in the description of the present invention below.

Referring to FIG. 3, showing an enlarged section of the insert 240 of FIG. 2, the insert 240 is bounded on its concave side 246 by the innerliner 234 and on its convex side 248 by the carcass ply 230. The portion of the wedge insert 240 most adjacent to the ground will deflect in such a way as to increase its concavity when subjected to the vertical loading encountered during normal-inflated operation and will deflect even more so during runflat operation. Accordingly, the concave axially innermost side 246 of the wedge insert 230 will experience compressive stress while the convex axially outermost side 248 will experience tensile stress. The tensile stress will be born primarily by the adjacent ply 230. Such compressive and tensile stresses are associated with the sidewall reinforcing properties of the insert 240 and ply 230, and exist even when the tire 200 (FIG. 2) is fully inflated.

Ideally, the reinforced sidewalls of a runflat tire should be as flexible during normal-inflated operation as those of a corresponding-sized non-runflat tire, yet rigid during runflat operation. But the sidewalls of the prior art runflat tires of the sorts shown in FIGS. 1, 2 and 3 are relatively rigid during normal inflated operation, because the sidewall-reinforcing wedge inserts make the runflat sidewalls less accommodating to ordinary road surface roughness than would be so for the sidewalls of corresponding non-runflat radial ply tires having a similar aspect ratio. Hence, the prior art inserts 140,141,240 of the prior art tires 100 and 200 result in a runflat tire whose normal-inflated use will reflect the presence of the reinforced and stiffened sidewalls. That is to say, the ride will be rougher and less comfortable due to the greater sidewall stiffness which arises from the greater rigidity imparted to the sidewall portions by the presence of the inserts.

FIG. 8 shows, in graph form, how stiffness of the insert changes as a normally inflated runflat tire gradually deflates. The insert stiffness increases only gradually as the tire gradually deflates. So, although it is desirable that the insert stiffness be very low during normal-inflated operation and very high during runflat operation, this cannot be achieved with conventional inserts, and the stiffness of conventional inserts is designed to be some compromise value in-between. It can now be understood, specifically graphically, that the prior art designs resulted in a runflat radial tire that exhibits equal reinforcing rigidity to each sidewall during both normal inflated operation and during runflat operation, thereby providing reduced riding comfort and poor handling characteristics during normal inflated operation as well as rigid structural support during runflat operation.

The prior art runflat radial tire also has a generally higher rolling resistance during normal-inflated operation and during runflat operation. Moreover, the prior art runflat radial tire contained inserts that generated heat during normal inflated high-speed operation and during runflat operation. Finally, the prior art runflat radial tire had limited runflat operational service life and only adequate handling characteristics.

Preferred Embodiment

The prior art single-wedge-insert-per-sidewall runflat designs shown in FIGS. 2 and 3 are particularly relevant to the present invention, because the present invention also contemplates a single wedge insert in each sidewall. A generalized embodiment of the insert of the present invention is shown in schematic cross-section in FIGS. 4A and 4B.

FIG. 4A shows a fragmentary schematic cross-section of one embodiment of a circumferentially disposed insert 440 according to the present invention. The profile of the insert 440 is shown in FIG. 4A as it would be in a normally inflated tire. The insert 440 is crescent-shaped in cross-section and comprises a crescent-shaped elastomeric porous section 442 at the axially-inner portion of the insert 440 attached to (embedded within) a generally bowed shaped elastomeric stiffer layer 444 (i.e. stiffer than the porous section 442) forming the axially outer portion of, and remainder of, the insert 440. The porous section 442 is attached to the stiffer layer 444 by any suitable means, such as cementing or molding one over the other. The porous layer 442 is preferably located at axially-inner portion of the insert 440, with its convex edge facing axially outward. The insert 440 is bounded on its axially-inner side by an innerliner 434 and on its axially-outer side by a ply 430.

The porous section 442 is typically a closed cell porous elastomer or thermoplastic elastomer. The porous section 442 has a compressive modulus of between about 3 MPa (mega pascal) and 10 MPa as it is squeezed before the pores are totally collapsed, and has a much higher compressive modulus of between about 15 MPa and 80 MPa when the pores have collapsed. The porosity (ratio of void volume to total elastomer volume) of porous section 442 is between 10 and 40 percent, and preferably between 20 and 30 percent. The stiffer layer 444 is of a typically nonporous elastomer or thermoplastic elastomer. The stiffer layer 444 is much stiffer than the porous section 442, being somewhat flexible but essentially inextensible, and has a compressive modulus of between about 3 MPa and 30 MPa, and preferably between 5 MPa and 20 MPa.

FIG. 4B shows the profile of the insert 440 of FIG. 4A as it would be in runflat operation (tire underinflated or deflated). The components and reference numbers match those of FIG. 4A. In both runflat operation and normal inflation, the porous section 442 is under compression and the stiffer layer 444 is under both tension and compression. During runflat operation, the porous section 442 is squeezed so much that its pores have substantially collapsed (in which case any air trapped in the pores is highly compressed and keeps the pores from totally collapsing). When the pores are collapsed (during runflat operation), the nominally porous section 442 is essentially no longer porous, but is rather now a solid elastomer. Therefore, the porous section 442 has a much higher modulus of elasticity (stiffness) when its pores are collapsed (during runflat operation) than when its pores are not collapsed (when its tire is normally inflated). In any of the embodiments of the invention, since the axially-inner portion of the porous section 442 is compressed more than its axially-outer portion, it is advantageous for the pores in the porous section 442 to be larger or more numerous in the axially-inner portion of the porous section 442 than in its axially-outer portion. While the porous section 442 is described as a closed cell foam, it is also within the terms of the invention to incorporate an open cell foam having a degree of porosity of between 60 and 90 percent elastomer and the remainder gas, such as-for example air.

FIG. 9 shows, in graph form, how porosity (ratio of void volume to total elastomer volume) of the porous layer 442 (shown by curve 902) and rigidity (herein defined as the incremental change of load weight per incremental change of deflection, similar to modulus of elasticity of the insert 440 (shown by curve 904) change as a normally inflated tire gradually deflates. As the pores are gradually closing, in zone 910, porosity (section 912 of curve 902) decreases with tire deflation, and insert stiffness (section 914 of curve 904) increases only slightly with tire deflation. As the pores become nearly collapsed in zone 920, the porosity (section 922 of curve 902) approaches zero, and insert stiffness (section 924 of curve 904) increases dramatically with tire deflation. When the pores have collapsed in zone 930 and void volume is essentially zero, porosity (section 932 of curve 902) remains essentially constant at about zero, and stiffness (section 934 of curve 904) rises negligibly with increasing tire deflation.

Hence, during runflat operation, the insert 440 is relatively stiff and supports the tire load, and during normal inflation, the insert 440 is relatively flexible and provides the desired driving characteristics of a non-runflat tire. This is what is desired of sidewall reinforcing inserts, and what the conventional solid inserts cannot achieve, as illustrated by FIG. 8.

FIG. 11A is a graph of load vs. tire deflection for a normally inflated tire, for a non-runflat tire (curve 1114), a prior art runflat tire (curve 1110), and a tire according to the present invention (curve 1112). FIG. 11A shows that tire deflection increases with increasing load on the tire. At a typical tire load level 1111, when normally inflated, the non-runflat tire and the runflat tire according to the present invention have deflected much more than the prior art runflat tire, thereby yielding a softer, more comfortable, ride. FIG. 11B is a graph of load vs. tire deflection for a deflated tire; for a non-runflat tire (curve 1124), a prior art runflat tire (curve 1120), and a tire according to the present invention (curve 1122). FIG. 11B shows that tire deflection increases with increasing load on the tire. At a typical tire load level 1111, when deflated, the non-runflat tire (curve 1124) is too deflected to carry the tire load, the prior art runflat tire (curve 1120) is deflected much less and can carry the tire load but with some flexing and heat damage, and the tire (curve 1122) according to the present invention can be approximately equal to the prior art runflat tire.

The inventive concept described herein affords to runflat radial ply tires an innovative wedge insert sidewall reinforcement which confers upon the thus reinforced sidewalls low stiffness during normal inflated operation and a high stiffness during runflat operation. In other words, runflat tires incorporating the present invention will provide a soft and comfortable ride with good vehicle-handling characteristics during normal-inflated operation, yet will provide the required sidewall rigidity needed for effective and long-lasting runflat service.

Second Embodiment

FIG. 5A shows a schematic cross-section of a second embodiment of a circumferentially disposed insert 540 according to the present invention. The profile of insert 540 is shown in FIG. 5A as it would be in a normally inflated tire. The insert 540 is crescent-shaped in cross-section and comprises a somewhat semicircular elastomeric porous section 542 embedded in the axially-inner portion of the insert 540 surrounded by an elastomeric stiffer layer 544 (i.e. stiffer than the porous section 542) that comprises the remainder of the insert 540. The porous section 542 is attached to the stiffer layer 544 by any suitable means, such as cementing or overmolding one over the other. The substantially semi-circular porous layer 542 is located at the vertically-center axially-inner portion of the insert 540, with its rounded edge facing axially outward. The insert 544 is bounded on its axially inner side by an innerliner 534 and on its axially outer side by a ply 530.

FIG. 5B shows the profile of the insert 540 of FIG. 5A as it would be in runflat operation. The components and reference numbers match those of FIG. 5A. The principle of operation of this second embodiment is the same is in the first embodiment (shown in FIGS. 4A and 4B). During runflat operation, the porous section 542 is squeezed so much that its pores have substantially collapsed. The porous section 542 has a much higher modulus of elasticity when its pores are collapsed (during runflat operation) than when its pores are not collapsed (when its tire is normally inflated). Hence, during runflat operation, the insert 540 is relatively stiff and supports the load on its tire, and during normal inflation, the insert 540 is relatively flexible and provides the desired driving characteristics of a non-runflat tire.

The porous section 542 is typically a closed cell porous elastomer or thermoplastic elastomer. The porous section 542 has a compressive modulus of between about 3 MPa and 10 MPa as it is squeezed before the pores are totally collapsed, and has a much higher compressive modulus of between about 15 MPa and 80 MPa when the pores have collapsed. The stiffer layer 544 is of a typically nonporous elastomer or thermoplastic elastomer. The stiffer layer 544 is much stiffer than the porous section 442, having a compressive modulus of between about 3 MPa and 30 MPa. The stiffer layer 544 is essentially inextensible and stiffer than the material used for the stiffer layer 444 (FIG. 4A,4B) of the first embodiment, since, in this second embodiment, the stiffer layer 544 should bend only in its region near the porous layer 542.

Third Embodiment

FIG. 6A shows a fragmentary schematic cross-section of a third embodiment of a circumferentially disposed insert 640 according to the present invention. The profile of insert 640 is shown in FIG. 6A as it would be in a normally inflated tire. The insert 640 is crescent-shaped in cross-section and comprises a substantially triangular elastomeric porous section 642 embedded in the axially-inner portion of the insert 640 surrounded by an elastomeric stiffer layer 644 (i.e. stiffer than the porous section 642) that comprises the remainder of the insert 640. The porous section 642 is attached to the stiffer layer 644 by any suitable means, such as cementing or overmolding one over the other. The triangular porous layer 642 is located at the axially-inner portion of the insert 640, with one of its apexes pointing axially outward. The insert 644 is bounded on its axially-inner side by an innerliner 634 and on its axially-outer side by a ply 630.

FIG. 6B shows the profile of the insert 640 of FIG. 6A as it would be in runflat operation. The components and reference numbers match those of FIG. 6A. The principle of operation of this third embodiment is the same is in the second embodiment of FIG. 5A, 5B. During runflat operation, the porous section 642 is squeezed so much that its pores have substantially collapsed. The porous section 642 has a much higher modulus of elasticity when its pores are collapsed (during runflat operation) than when its pores are not collapsed (when its tire is normally inflated). Hence, during runflat operation, the insert 640 is relatively stiff and supports the load on its tire, and during normal inflation, the insert 640 is relatively flexible and provides the desired driving characteristics of a non-runflat tire.

The choice of materials and material specifications are the same for this third embodiment as for the second embodiment, previously described.

It would be desirable for the stiffer layer 644 to be flexible near the porous section 642 to better serve as a hinge around which the insert 640 bends under load, yet stiff everywhere else to provide maximum rigidity under runflat conditions. Unfortunately, making the stiffer layer 644 more flexible (by choosing a more flexible material or by making it thinner) to improve the hinge effect would compromise rigidity during runflat operation, and making the stiffer layer 644 more rigid to improve rigidity during runflat operation would compromise the hinge effect. Hence, the designer must choose some intermediate rigidity for the stiffer layer 644.

Fourth Embodiment

FIG. 7A shows a fragmentary schematic cross-section of a fourth embodiment of a circumferentially disposed insert 740 according to the present invention. The profile of insert 740 is shown in FIG. 7A as it would be in a normally inflated tire. The insert 740 is crescent-shaped in cross-section and includes a cross-sectionally triangular elastomeric porous section 742 embedded in the radially-center axially-inner portion of the insert 740, affixed to a flexible inextensible hinge section ("hinge") 746 embedded in the axially-outer portion of the insert 740, and two stiff wedges 744A,744B (much stiffer than the porous section 742) that constitute the remainder of the insert 740. The porous section 742, the hinge section 746, and the stiff wedges 744A,744B are affixed together by a suitable means, such as overmolding each over the other(s). The insert 740 is bounded on its axially inner side by an innerliner 734 and on its axially outer side by a ply 730.

The triangular porous layer 742 is located at the axially-inner portion of the insert 740, with one of its apexes pointing axially outward. The hinge section 746 is located vertically symmetric around porous section 742. In FIG. 7A, the top edge 748A and bottom edge 748B of the hinge section 746 are shown not to extend vertically beyond porous section 742, but that is not required. The top edge 748A of the hinge section 746 might extend above the porous section 742, and the bottom edge 748B of the hinge section 746 might extend below the porous section 742.

Under load, the hinge section 746 serves as a hinge around which the stiff wedges 744A,744B pivot to squeeze the porous section 742. Under load (either normal inflation or runflat), the porous section 742 is under compression and becomes smaller, and the hinge section 746 is under tension but does not stretch because it is inextensible. The hinge section 746 should be as flexible as possible but as inextensible as possible, such as by using fiber reinforced elastomer. The high flexibility will reduce flexural degradation, and the inextensibility will enable the hinge section 746 to serve as a hinge without expanding under tension.

FIG. 7B shows the profile of the insert 740 of FIG. 7A as it would be in runflat operation. The components and reference numerals match those of FIG. 7A. The principle of operation of this fourth embodiment is the same is in the third embodiment (of FIG. 6A,6B), but with the added following advantages. During runflat operation, the porous section 742 is squeezed so much that its pores have collapsed and it becomes very stiff, and the hinge section 746 is also very stiff since it is under tension and inextensible, and the stiff wedges 744A,744B are always very stiff, so the entire insert 740 becomes very stiff during runflat operation. During normal inflation, the insert 740 can be very flexible due to the flexible porous section 742 and the flexible hinge section 746 acting as a hinge. Hence, during runflat operation, the insert 740 is exceptionally stiff (stiffer than insert 640 of the third embodiment) and rigidly supports the load on its tire, and during normal inflation, the insert 740 is exceptionally flexible (more flexible than insert 640 of the third embodiment) and provides the desired flexible driving characteristics of a non-runflat tire.

The porous section 442 is typically a closed cell porous elastomer or thermoplastic elastomer. The porous section 442 has a compressive modulus of between about 3 MPa (mega pascal) and 10 MPa as it is squeezed before the pores are totally collapsed, and has a much higher compressive modulus of between about 15 MPa and 80 MPa when the pores have collapsed. The hinge section 746 is of a typically nonporous highly flexible inextensible elastomer such as fiber reinforced elastomer or thermoplastic elastomer. The rigid wedges 744A,744B might be of the materials polymers or thermoplastic polymers FIG. 10 shows a cross-sectional view of a runflat tire 1000 incorporating the first embodiment of the present invention. The tire 1000 has a tread 1012, a belt structure (belts) 1014, a pair of sidewalls 1016 and a carcass 1022. The carcass 1022 comprises at least one ply 1030, a gas-impervious innerliner 1034 and a pair of bead regions 1020. Each bead region 1020 comprises a bead 1036 and a bead filler apex 1021. Each sidewall 1016 contains an insert 1040 which is disposed between the innerliner 1034 and the ply 1030.

The insert 1040 is the same as that of the embodiment of FIG. 4A, being crescent-shaped in cross-section and comprising a crescent-shaped elastomeric porous section 1042 at the axially-inner portion of the insert 1040 attached to a bowed elastomeric stiffer layer 1044 (i.e. stiffer than the porous section 1042) along the axially outer portion of the insert 1040. The porous layer 1042 is located at the vertically-center axially-inner portion of the insert 1040, with its convex edge facing axially outward. Alternatively, the insert 1040 could be the same as that of the embodiment of FIG. 5A, 6A or 7A.

The embodiment illustrated in FIG. 10 is that of a runflat tire design in which the reinforced sidewalls have a low structural moment of inertial during normal inflated operation and a high structural moment of inertial during runflat operation.

As illustrated in the four embodiments herein, the present invention satisfies the features that are lacking in the prior art. It provides a tire insert that provides to each sidewall minimal reinforcing rigidity during normal inflated operation and maximum reinforcing rigidity during runflat operation, thereby providing improved riding comfort and handling characteristics during normal inflated operation as well as rigid structural support during runflat operation. Since a portion of the insert of the present invention is porous, it can be lighter than a conventional insert. During normal inflation, since most of the flexing of the insert in the present invention is born by the soft porous section, there is less rolling resistance and hence less heat and better handling characteristics. During runflat operation, since the insert is more rigid than a conventional insert, less flexing and accompanying heat is produced.

While the invention has been described in combination with embodiments thereof, it is evident that many alternatives, modifications, and variations will be apparent to those skilled in the art in light of the foregoing description and discussion. The present invention is intended to embrace all such alternatives, modifications and variations as fall within the scope of the appended claims.

What is claimed:

1. A pneumatic radial ply runflat tire having a tread, a carcass comprising at least one radial ply and two bead regions and two sidewalls each reinforced by at least one insert, a belt structure between the tread and the carcass, the tire characterized by:

each insert having an elastomeric porous section located at the axially-inner portion of the insert, the elastomeric porous section being embedded into an elastomeric stiffer layer which constitutes the remainder of the insert;

the porous section having a crescent shaped cross-section;

the elastomeric porous section being a closed cell porous elastomer or thermoplastic elastomer; and the porosity of the porous sections is between 10 and 40 percent elastomer and the remainder gas.

2. The tire of claim 1 wherein the porous section has a compressive modulus of between 3 MPa and 10 MPa as the porous section is squeezed and a compressive modulus of between 15 MPa and 80 MPa when the porous section has collapsed.

3. The tire of claim 2 wherein the stiffer layer is a nonporous elastomer or thermoplastic elastomer.

4. The tire of claim 3 wherein the stiffer layer has a compressive modulus of between 3 MPa and 30 MPa.

5. A pneumatic radial ply runflat tire having a tread, a carcass comprising at least one radial ply and two bead regions and two sidewalls each reinforced by at least one insert, a belt structure between the tread and the carcass, the tire characterized by:

each insert having an elastomeric porous section located at the axially-inner portion of the insert, the elastomeric porous section being embedded into an elastomeric stiffer layer which constitutes the remainder of the insert;

the elastomeric porous section is a closed cell porous elastomer or thermoplastic elastomer; and the porosity of the porous sections is between 10 and 40 percent elastomer and the remainder gas.

6. The tire of claim 5 wherein the stiffer layer is a nonporous elastomer or thermoplastic elastomer.

7. The tire of claim 6 wherein the stiffer layer has a compressive modulus of between 3 MPa and 30 MPa.

8. A pneumatic radial ply runflat tire having a tread, a carcass comprising at least one radial ply and two bead regions and two sidewalls each reinforced by at least one insert, a belt structure between the tread and the carcass, the tire characterized by:

each insert having an elastomeric porous section located at the axially-inner portion of the insert, the elastomeric porous section being embedded into an elastomeric stiffer layer which constitutes the remainder of the insert;

the elastomeric porous section is a closed cell porous elastomer or thermoplastic elastomer; and the porous section has a compressive modulus of between 3 MPa and 10 MPa as the section is squeezed and a compressive modulus of between 15 MPa and 80 MPa when the porous section has collapsed.

9. The tire of claim 8 wherein the stiffer layer is a nonporous elastomer or thermoplastic elastomer.

10. The tire of claim 9 wherein the stiffer layer has a compressive modulus of between 3 MPa and 30 MPa.

* * * * *